United States Patent
Zheng

(10) Patent No.: US 9,983,770 B2
(45) Date of Patent: May 29, 2018

(54) SCREEN CAPTURE METHOD, APPARATUS, AND TERMINAL DEVICE

(71) Applicant: Huawei Technologies Co., Ltd., Shenzhen (CN)

(72) Inventor: Kaifang Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 14/901,866

(22) PCT Filed: Mar. 10, 2014

(86) PCT No.: PCT/CN2014/073114
§ 371 (c)(1),
(2) Date: Dec. 29, 2015

(87) PCT Pub. No.: WO2015/032190
PCT Pub. Date: Mar. 12, 2015

(65) Prior Publication Data
US 2016/0313883 A1 Oct. 27, 2016

(30) Foreign Application Priority Data
Sep. 9, 2013 (CN) .......................... 2013 1 0405023

(51) Int. Cl.
*G06F 3/0484* (2013.01)
*G06F 3/0488* (2013.01)

(52) U.S. Cl.
CPC ........ *G06F 3/0484* (2013.01); *G06F 3/04842* (2013.01); *G06F 3/04883* (2013.01); *G06F 2203/04808* (2013.01)

(58) Field of Classification Search
CPC .................................. G06F 3/01; G06F 3/041
See application file for complete search history.

(56) References Cited

U.S. PATENT DOCUMENTS

2010/0259491 A1  10/2010  Rajamani et al.
2012/0056832 A1   3/2012  Miyazaki et al.
(Continued)

FOREIGN PATENT DOCUMENTS

CN  102147793 A  8/2011
CN  102662510 A  9/2012
(Continued)

OTHER PUBLICATIONS

Villamor, C., et al., "Touch Gesture Reference Guide," Retrieved from the Internet: URL:http://static.lukew.com/TouchGestureGuide.pdf [retrieved on Jun. 15, 2015], Apr. 15, 2010, 7 pages.
(Continued)

*Primary Examiner* — Olga Merkoulova
(74) *Attorney, Agent, or Firm* — Conley Rose, P.C.

(57) ABSTRACT

A screen capture method, an apparatus, and a terminal device where a part of an image in a screen display region can be captured by means of gesture recognition. When it is detected that two fingers swipe parallel in a same direction on a screen, acquiring a screen capture region according to the same-direction parallel swiping; and acquiring, according to the screen capture region, an image displayed in the screen capture region. According to the screen capture method, a screen capture operation is performed by recognizing same-direction parallel swiping of two fingers on a screen, so that a user can capture an image displayed in a part of a region of the screen according to an individual requirement, and the screen capture method is applicable to various touch-operation terminal devices without the help of an external tool, thereby simplifying the operation and improving user experience.

20 Claims, 7 Drawing Sheets

(56) References Cited

U.S. PATENT DOCUMENTS

| | | | |
|---|---|---|---|
| 2012/0188271 A1 | 7/2012 | Kim | |
| 2012/0206374 A1 | 8/2012 | Chen et al. | |
| 2012/0218203 A1* | 8/2012 | Kanki | G06F 3/0485 345/173 |
| 2012/0327121 A1* | 12/2012 | Dhawade | G06F 3/04883 345/649 |
| 2014/0189726 A1* | 7/2014 | Yoneda | H04N 21/25816 725/25 |
| 2014/0347308 A1* | 11/2014 | Glazer | G06F 3/04883 345/173 |
| 2015/0317064 A1* | 11/2015 | Zhu | G06F 3/0488 345/643 |

FOREIGN PATENT DOCUMENTS

| | | | |
|---|---|---|---|
| CN | 102693075 A | 9/2012 | |
| CN | 102968274 A | 3/2013 | |
| CN | 103019597 A | 4/2013 | |
| CN | 103037102 A | 4/2013 | |
| CN | 103092520 A | 5/2013 | |
| CN | 103473012 A | 12/2013 | |
| JP | 20110186550 A | 9/2011 | |
| JP | 2012058856 A | 3/2012 | |
| JP | 2012524474 A | 10/2012 | |
| JP | 2013171365 A | 9/2013 | |
| KR | 20130031762 A | 3/2013 | |
| WO | 2013116219 A1 | 8/2013 | |

OTHER PUBLICATIONS

Foreign Communication From a Counterpart Application, European Application No. 14842688.5, Extended European Search Report dated Jun. 10, 2016, 7 pages.
Partial English Translation and Abstract of Chinese Patent Application No. CN103037102, May 28, 2016, 5 pages.
Foreign Communication From a Counterpart Application, Chinese Application No. 201310405023.6, Chinese Office Action dated Apr. 15, 2016, 9 pages.
Partial English Translation and Abstract of Chinese Patent Application No. CN201310405023.6, Chinese Search Report dated Apr. 5, 2016, 2 pages.
Partial English Translation and Abstract of Chinese Patent Application No. CN102147793, Apr. 9, 2016, 4 pages.
Partial English Translation and Abstract of Chinese Patent Application No. CN103092520, Apr. 5, 2015, 4 pages.
Partial English Translation and Abstract of Chinese Patent Application No. CN103473012, Dec. 16, 2015, 3 pages.
Foreign Communication From a Counterpart Application, PCT Application No. PCT/CN2014/073114, English Translation of International Search Report dated Jun. 20, 2014, 2 pages.
Foreign Communication From a Counterpart Application, PCT Application No. PCT/CN2014/073114, English Translation of Written Opinion dated Jun. 20, 2014, 11 pages.
Partial English Translation and Abstract of Japanese Patent Application No. JPA2012-58856, Nov. 10, 2016, 69 pages.
Partial English Translation and Abstract of Japanese Patent Application No. JPA2013171365, Nov. 10, 2016, 25 pages.
Foreign Communication From a Counterpart Application, Japanese Application No. 2016-528304, Japanese Office Action dated Sep. 13, 2016, 3 pages.
Foreign Communication From a Counterpart Application, Japanese Application No. 2016-528304, English Translation of Japanese Office Action dated Sep. 13, 2016, 3 pages.
Foreign Communication From a Counterpart Application, Korean Application No. 1020167000557, Korean Office Action dated Nov. 16, 2016, 5 pages.
Foreign Communication From a Counterpart Application, Korean Application No. 1020167000557, English Translation of Korean Office Action dated Nov. 16, 2016, 3 pages.
Foreign Communication From a Counterpart Application, Japanese Application No. 2016-528304, Japanese Notice of Allowance dated Mar. 28, 2017, 3 pages.

* cited by examiner

SCREEN CAPTURE METHOD, APPARATUS, AND TERMINAL DEVICE

CROSS-REFERENCE TO RELATED APPLICATIONS

This application is a National Stage of International Application No. PCT/CN2014/073114, filed on Mar. 10, 2014, which claims priority to Chinese Patent Application No. 201310405023.6, filed on Sep. 9, 2013, both of which are hereby incorporated by reference in their entireties.

TECHNICAL FIELD

Embodiments of the present disclosure relate to the field of touch applications, and in particular, to a screen capture method, and apparatus, and a terminal device.

BACKGROUND

With the development of intelligent terminal devices, a screen capture function has become a basic configuration of the terminal device. However, up to the present, for most terminal devices, screen capture is implemented by using a combination of hardware buttons, and only an image displayed on an entire screen can be captured, which lacks content pertinence; a user usually needs to perform further processing such as clipping on a captured image, where the operation is tedious and complex. For some latest terminal devices, screen capture for a specific region can be implemented by recognizing a swipe track of a stylus on a screen. However, the screen capture for a specific region can only be implemented with the help of the stylus; and therefore, a screen capture operation is tedious and complex, and user experience is yet to be further improved.

SUMMARY

The present disclosure provides a screen capture method, an apparatus and a terminal device, where a part of an image in a screen display region can be captured by means of gesture recognition.

According to a first aspect, a screen capture method is provided, including, when it is detected that two fingers swipe parallel in a same direction on a screen, acquiring a screen capture region according to the same-direction parallel swiping; and acquiring, according to the screen capture region, an image displayed in the screen capture region.

With reference to the first aspect, in a first possible implementation manner, after the detecting that two fingers swipe parallel in a same direction on a screen, and before the acquiring a screen capture region according to the same-direction parallel swiping, the method further includes acquiring swipe tracks of the same-direction parallel swiping according to the same-direction parallel swiping; and acquiring start point positions and/or end point positions of the same-direction parallel swiping according to the same-direction parallel swiping.

With reference to the first possible implementation manner of the first aspect, in a second possible implementation manner, the acquiring a screen capture region according to the same-direction parallel swiping includes acquiring the screen capture region according to any one or any combination of multiple of the start point positions, the end point positions, and the swipe tracks when the start point positions and/or the end point positions are in a display region at a screen edge.

With reference to the second possible implementation manner of the first aspect, in a third possible implementation manner, the acquiring the screen capture region according to any one or any combination of multiple of the start point positions, the end point positions, and the swipe tracks when the start point positions and/or the end point positions are in a display region at a screen edge includes, when the start point positions and/or the end point positions are in a display region at a screen edge, acquiring the screen capture region according to a region enclosed by the swipe tracks and horizontal lines or by the swipe tracks and vertical lines.

With reference to the second possible implementation manner of the first aspect, in a fourth possible implementation manner, the acquiring the screen capture region according to any one or any combination of multiple of the start point positions, the end point positions, and the swipe tracks when the start point positions and/or the end point positions are in a display region at a screen edge includes, when the start point positions and/or the end point positions are in a display region at a screen edge, acquiring the screen capture region according to a region enclosed by connection lines between the start point positions and the end point positions and horizontal lines or by the connection lines and vertical lines; or when the start point positions and/or the end point positions are in a display region at a screen edge, acquiring the screen capture region according to a region enclosed by successively connecting the start point positions and the end point positions.

With reference to the third or the fourth possible implementation manner of the first aspect, in a fifth possible implementation manner, when the region is non-rectangular, the screen capture region is a largest-area or smallest-area rectangle region covered by the region.

According to a second aspect, a screen capture apparatus is provided, including a first acquiring module configured to, when it is detected that two fingers swipe parallel in a same direction on a screen, acquire a screen capture region according to the same-direction parallel swiping; and a screen capture module configured to acquire, according to the screen capture region acquired by the first acquiring module, an image displayed in the screen capture region.

With reference to the second aspect, in a first possible implementation manner, the screen capture apparatus further includes a second acquiring module configured to, after the first acquiring module detects that the two fingers swipe parallel in a same direction on the screen and before the screen capture region is acquired according to the same-direction parallel swiping, acquire swipe tracks of the same-direction parallel swiping according to the same-direction parallel swiping, and acquire start point positions and/or end point positions of the same-direction parallel swiping according to the same-direction parallel swiping.

With reference to the first possible implementation manner of the second aspect, in a second possible implementation manner, the first acquiring module is configured to acquire the screen capture region according to any one or any combination of multiple of the start point positions, the end point positions, and the swipe tracks when the start point positions and/or the end point positions that are acquired by the second acquiring module are in a display region at a screen edge.

With reference to the second possible implementation manner of the second aspect, in a third possible implementation manner, the first acquiring module is configured to, when the start point positions and/or the end point positions that are acquired by the second acquiring module are in a display region at a screen edge, acquire the screen capture region according to a region enclosed by the swipe tracks and horizontal lines or by the swipe tracks and vertical lines.

With reference to the second possible implementation manner of the second aspect, in a fourth possible implementation manner, the first acquiring module is configured to, when the start point positions and/or the end point positions that are acquired by the second acquiring module are in a display region at a screen edge, acquire the screen capture region according to a region enclosed by connection lines between the start point positions and the end point positions and horizontal lines or by the connection lines and vertical lines; or configured to, when the start point positions and/or the end point positions that are acquired by the second acquiring module are in a display region at a screen edge, acquire the screen capture region according to a region enclosed by successively connecting the start point positions and the end point positions.

With reference to the third or the fourth possible implementation manner of the second aspect, in a fifth possible implementation manner, the first acquiring module is further configured to, when the region is non-rectangular, determine that the screen capture region is a largest-area or smallest-area rectangle region covered by the region.

According to a third aspect, a terminal device is provided, including a touch display configured to present an operation interface corresponding to a function provided by the terminal device, and acquire a touch signal corresponding to a received touch operation; and a processor configured to determine, according to the touch signal acquired by the touch display, the touch operation received by the touch display, and when the touch operation is same-direction parallel swiping, acquire a screen capture region according to the same-direction parallel swiping, and capture an image displayed in the screen capture region.

With reference to the third aspect, in a first possible implementation manner, the processor is further configured to, before acquiring the screen capture region according to the same-direction parallel swiping, acquire swipe tracks of the same-direction parallel swiping, and acquire start point positions and/or end point positions of the same-direction parallel swiping.

With reference to the first possible implementation manner of the third aspect, in a second possible implementation manner, the processor is configured to acquire the screen capture region according to any one or any combination of multiple of the start point positions, the end point positions, and the swipe tracks when the start point positions and/or the end point positions are in a display region at a screen edge.

With reference to the second possible implementation manner of the third aspect, in a third possible implementation manner, the processor is configured to, when the start point positions and/or the end point positions are in a display region at a screen edge, acquire the screen capture region according to a region enclosed by the swipe tracks and horizontal lines or by the swipe tracks and vertical lines.

With reference to the second possible implementation manner of the third aspect, in a fourth possible implementation manner, the processor is configured to, when the start point positions and/or the end point positions are in a display region at a screen edge, acquire the screen capture region according to a region enclosed by connection lines between the start point positions and the end point positions and horizontal lines or by the connection lines and vertical lines; or when the start point positions and/or the end point positions are in a display region at a screen edge, acquire the screen capture region according to a region enclosed by successively connecting the start point positions and the end point positions.

With reference to the third or the fourth possible implementation manner of the third aspect, in a fifth possible implementation manner, the processor is further configured to, when the region is non-rectangular, determine that the screen capture region is a largest-area or smallest-area rectangle region covered by the region.

Based on the foregoing technical solutions, according to the screen capture method, apparatus, and terminal device in the embodiments of the present disclosure, a screen capture operation is performed by recognizing same-direction parallel swiping of two fingers on a screen, so that a user can capture an image displayed in a part of a region of the screen according to an individual requirement, and the screen capture method is applicable to various touch-operation terminal devices without the help of an external tool, thereby simplifying the operation and improving user experience.

BRIEF DESCRIPTION OF DRAWINGS

To describe the technical solutions in the embodiments of the present disclosure more clearly, the following briefly introduces the accompanying drawings required for describing the embodiments of the present disclosure or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that in the embodiments of the present disclosure, user equipment (UE) may be a mobile phone, a tablet computer, a computer having a mobile terminal, or the like. For example, the terminal device may also be a portable, pocket-sized, handheld, computer built-in, or vehicle-mounted mobile apparatus. The embodiments of the present disclosure are not limited thereto.

Figure 1:
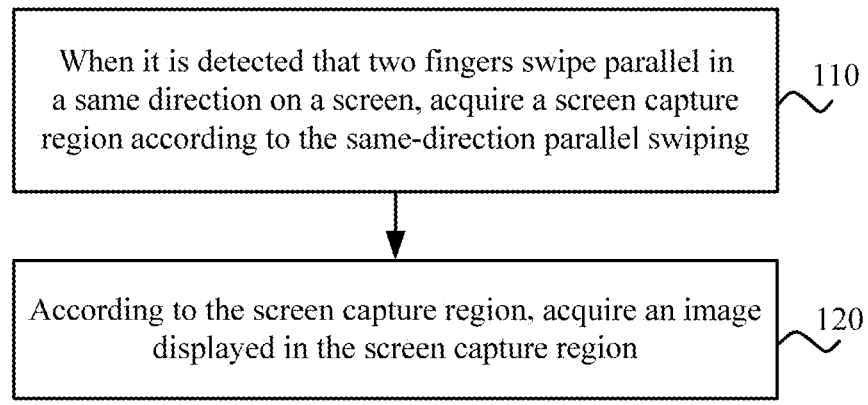
FIG. 1 is a schematic flowchart of a screen capture method according to an embodiment of the present disclosure.

FIG. 1 shows a schematic flowchart of a screen capture method 100 according to an embodiment of the present disclosure, where the method may be executed by a screen capture apparatus. Optionally, the screen capture apparatus may be an independent apparatus, or may be a module in a terminal device. This embodiment of the present disclosure is not limited thereto. As shown in FIG. 1, the method 100 includes the following steps.

S110. When it is detected that two fingers swipe parallel in a same direction on a screen, acquire a screen capture region according to the same-direction parallel swiping.

S120. According to the screen capture region, acquire an image displayed in the screen capture region.

Therefore, according to the screen capture method in this embodiment of the present disclosure, a screen capture operation is performed by recognizing same-direction parallel swiping of two fingers on a screen, so that a user can capture an image displayed in a part of a region of the screen according to an individual requirement, and the method is applicable to various touch-operation terminal devices without the help of an external tool, thereby simplifying the operation and improving user experience.

Optionally, in S110, the screen capture apparatus may detect a touch point on the screen of the screen capture apparatus. When the terminal device detects two touch points on the screen, that is, the two fingers touch the screen simultaneously, and when the two touch points continuously and smoothly move over time, a touch operation of the two fingers may be determined according to moving tracks of the two touch points.

Optionally, when the screen capture apparatus detects that the two touch points continuously move parallel along the screen in a same direction as time elapses, that is, the two fingers incessantly swipe parallel in a same direction on the screen, it can be determined that the touch operation is a screen capture operation. Optionally, the moving tracks of the two touch points may be straight lines, or may be bending lines that approximate to straight lines. In this case, the screen capture apparatus may perform smoothing processing on the bending lines that approximate to straight lines, so as to obtain straight lines corresponding to the moving tracks. However, this embodiment of the present disclosure is not limited thereto.

When the moving tracks of the two touch points keep same-direction parallel, the screen capture apparatus can determine that the two fingers swipe parallel in a same direction on the screen. When the moving tracks of the two touch points are approximately same-direction parallel, that is, there is an included angle within a preset included angle range between the moving tracks of the two touch points, the screen capture apparatus can also determine that the two fingers swipe parallel in a same direction on the screen, where setting of the preset included angle range should avoid mistaken determining of a touch operation as much as possible. However, this embodiment of the present disclosure is not limited thereto.

Figure 2:
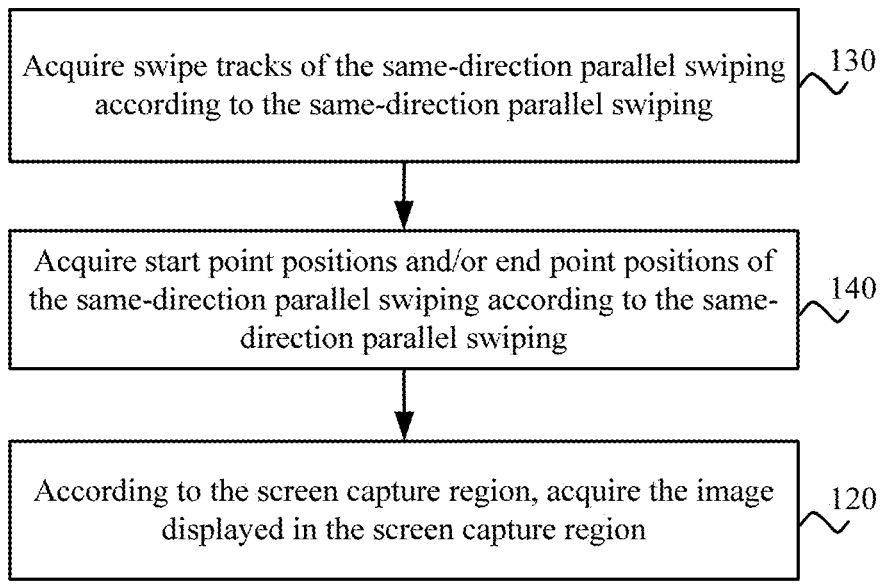
FIG. 2 is another schematic flowchart of a screen capture method according to an embodiment of the present disclosure.

Optionally, when the screen capture apparatus determines that the touch operation is a screen capture operation, the screen capture apparatus may acquire start point positions and/or end point positions of the same-direction parallel swiping, and acquire the screen capture region according to the start point positions and/or the end point positions. Correspondingly, as shown in FIG. 2, after the detecting that two fingers swipe parallel in a same direction on a screen and before the acquiring a screen capture region according to the same-direction parallel swiping, the method 100 further includes the following steps.

S130. Acquire swipe tracks of the same-direction parallel swiping according to the same-direction parallel swiping.

S140. Acquire start point positions and/or end point positions of the same-direction parallel swiping according to the same-direction parallel swiping.

To avoid mistaken recognition of the screen capture operation by the terminal device, the screen capture apparatus may determine that the touch operation is a screen capture operation only when it is detected that the start point positions and the end point positions of the same-direction parallel swiping are in a preset edge display region of the screen. The screen capture apparatus may determine that the touch operation is a screen capture operation only when two start points of the same-direction parallel swiping are both in the edge display region, or may determine that the touch operation is a screen capture operation when one or two start points of the same-direction parallel swiping is/are in the edge display region. Optionally, in another embodiment, the screen capture apparatus may determine that the touch operation is a screen capture operation only when two end point positions of the same-direction parallel swiping are both in the edge display region, or may determine that the touch operation is a screen capture operation when one or two end point positions of the same-direction parallel swiping is/are in the edge display region. Optionally, in another embodiment, the screen capture apparatus may determine that the touch operation is a screen capture operation only when at least one start point and at least one end point position of the same-direction parallel swiping are both in the edge display region, or may determine that the touch operation is same-direction parallel swiping when at least one start point and/or at least one end point of the same-direction parallel swiping are/is in the edge display region. This embodiment of the present disclosure is not limited thereto.

The edge display region may be preset. The edge display region may include positions on borders of a display region of the screen, and the edge display region may be a region inside the display region of the screen but outside a preset rectangular region, where the preset rectangular region is in the display region of the screen and is concentric with the display region of the screen. However, this embodiment of the present disclosure is not limited thereto.

Optionally, in S110, the acquiring a screen capture region according to the same-direction parallel swiping includes the following step.

S111. Acquire the screen capture region according to any one or any combination of multiple of the start point positions, the end point positions, and the swipe tracks when the start point positions and/or the end point positions are in a display region at a screen edge.

Optionally, in another embodiment, when the screen capture apparatus detects that a start point of the same-direction parallel swiping is in the preset rectangular region, it can be determined that the start point is outside the edge display region of the terminal device. When the screen capture apparatus detects that an end point of the same-direction parallel swiping is in the preset rectangular region, it can be determined that the end point is outside the edge display region of the terminal device. When the terminal device detects that neither of the two start point positions of the same-direction parallel swiping is in the edge display region, and/or neither of the two end point positions of the same-direction parallel swiping is in the edge display region, the terminal device can determine that the touch operation is an invalid operation, and does not execute a screen capture operation. However, this embodiment of the present disclosure is not limited thereto.

It should be understood that, in this embodiment of the present disclosure, the start point positions and the end point positions of the same-direction parallel swiping indicate start point positions and end point positions of the same-direction parallel swiping that are determined by the screen capture apparatus, and the start point positions and the end point positions of the same-direction parallel swiping that are determined by the screen capture apparatus may be different from start point positions and end point positions of actual swiping of the two fingers on an upper surface on which the display region of the screen is located. For example, when the two fingers continuously swipe across the display region of the screen, each taking a point that is on the upper surface on which the screen is located but is outside the display region of the screen as a start point, and stopping at a point that is outside the display region and is on another side of the upper surface, because the screen capture apparatus cannot detect a touch signal outside the display region of the screen, start point positions and end point positions of the same-direction parallel swiping that are detected by the screen capture apparatus are all on borders of the display region of the screen. Therefore, it may be considered that the start points and the end points of the same-direction parallel swiping are all in a display region at a screen edge. However, this embodiment of the present disclosure is not limited thereto.

Optionally, in another embodiment, the screen capture apparatus may acquire the screen capture region in multiple optional manners. For example, the screen capture apparatus may use a region enclosed by the swipe tracks of the same-direction parallel swiping and horizontal lines or by the swipe tracks and vertical lines as the screen capture region, or perform smoothing processing on the swipe tracks of the same-direction parallel swiping and use a region enclosed by smoothed swipe tracks and horizontal lines or by the smoothed swipe tracks and vertical lines as the screen capture region, or use a region enclosed by connection lines between the start points and the end points of the swipe tracks and horizontal lines or by the connection lines and vertical lines as the screen capture region, or the like. Correspondingly, in S111, the acquiring the screen capture region according to any one or any combination of multiple of the start point positions, the end point positions, and the swipe tracks when the start point positions and/or the end point positions are in a display region at a screen edge includes the following step.

S111a. When the start point positions and/or the end point positions are in a display region at a screen edge, acquire the screen capture region according to a region enclosed by the swipe tracks and horizontal lines or by the swipe tracks and vertical lines.

Figure 3:
FIG. 3 is a schematic diagram of a screen capture operation according to an embodiment of the present disclosure.
Figure 5:
FIG. 5 is a schematic diagram of another screen capture operation according to an embodiment of the present disclosure.

The screen capture apparatus may use a region enclosed by the swipe tracks and horizontal lines or by the swipe tracks and vertical lines as the screen capture region, or may perform smoothing processing on the swipe tracks and use a region enclosed by smoothed swipe tracks and horizontal lines or by the smoothed swipe tracks and vertical lines as the screen capture region. This embodiment of the present disclosure is not limited thereto. As shown in FIG. 3, when the swipe tracks of the same-direction parallel swiping are along a horizontal direction, the screen capture apparatus may use a region enclosed by the two swipe tracks of the same-direction parallel swiping and two vertical lines as the screen capture region. Optionally, as shown in FIG. 5, when the swipe tracks are along a vertical direction, the screen capture apparatus may use a region enclosed by the two swipe tracks of the same-direction parallel swiping and two horizontal lines as the screen capture region. Optionally, when there is an oblique angle that is not equal to 90 degrees between the swipe tracks of the same-direction parallel swiping and the horizontal direction, the screen capture apparatus may determine, according to the oblique angle of the swipe tracks, whether to use a region enclosed by the swipe tracks and horizontal lines as the screen capture region or use a region enclosed by the swipe tracks and vertical lines as the screen capture region. This embodiment of the present disclosure is not limited thereto.

Optionally, in another embodiment, in S111, the acquiring the screen capture region according to any one or any combination of multiple of the start point positions, the end point positions, and the swipe tracks when the start point positions and/or the end point positions are in a display region at a screen edge includes the following steps.

S111b. when the start point positions and/or the end point positions are in a display region at a screen edge, acquire the screen capture region according to a region enclosed by connection lines between the start point positions and the end point positions and horizontal lines or by the connection lines and vertical lines; or S111c. when the start point positions and/or the end point positions are in a display region at a screen edge, acquire the screen capture region according to a region enclosed by successively connecting the start point positions and the end point positions.

In S111b, when the connection lines between the start points and the end points of the two swipe tracks of the same-direction parallel swiping are both along the horizontal direction and the two start point positions and the two end point positions are separately on a same vertical line, the screen capture apparatus may use a rectangular region enclosed by the two connection lines and the vertical lines as the screen capture region. Optionally, when the connection lines between the start point positions and the end point positions of the two swipe tracks are both along the vertical direction and the two start point positions and the two end point positions are separately on a same horizontal line, the screen capture apparatus may use an rectangular region enclosed by the two connection lines and the horizontal lines as the screen capture region. Optionally, when the connection lines between the start point positions and the end point positions of the same-direction parallel swiping are neither along the horizontal direction nor along the vertical direction and the two start point positions and the two end point positions are separately on a same horizontal line or vertical line, the screen capture apparatus may use a parallelogram region enclosed by the two connection lines and the vertical lines or the horizontal lines as the screen capture region. Optionally, when the start point positions of the two swipe tracks are not on a same vertical line or horizontal line, the screen capture apparatus may choose, on a specific basis, one of the start point positions as a reference to acquire the screen capture region. Correspondingly, when the end point positions of the two swipe tracks are not on a same vertical line, the screen capture apparatus may also choose, on a specific basis, one of the end point positions as a reference to acquire the screen capture region, where the basis may be that the screen capture region has a relatively large or small area, or the like. This embodiment of the present disclosure is not limited thereto.

In S111c, the screen capture apparatus successively connects the start point positions and the end point positions of the two swipe tracks, and uses a quadrilateral region enclosed by four connection lines as the screen capture region. However, this embodiment of the present disclosure is not limited thereto.

Optionally, in another embodiment, the screen capture apparatus may also use a rectangular region enclosed by the connection lines between the start point positions and the end point positions of the swiping of the two fingers and lines perpendicular to the connection lines as the screen capture region. When a swipe direction of the same-direction parallel swiping is the horizontal direction, the lines perpendicular to the connection lines between the start point positions and the end point positions are vertical lines; or when a swipe direction of the same-direction parallel swiping is the vertical direction, the lines perpendicular to the connection lines between the start point positions and the end point positions are horizontal lines. Optionally, when the connection lines between the start point positions and the end point positions of the same-direction parallel swiping are not completely parallel and have a very small angle, the screen capture apparatus may use one of the connection lines as a reference to adjust the other connection line, so that the two connection lines are parallel to each other. This embodiment of the present disclosure is not limited thereto.

Optionally, for the horizontal direction and the vertical direction, a longitudinal direction of the screen capture apparatus in a current posture of the screen capture apparatus may be used as the horizontal direction, and a latitudinal direction of the screen capture apparatus may be used as the vertical direction; or the vertical direction may always be the direction of gravity, and the horizontal direction may be a direction perpendicular to the vertical direction, which has nothing to do with a current posture of the screen capture apparatus. In whatever case, the horizontal lines are parallel to the horizontal direction, and the vertical lines are parallel to the vertical direction. This embodiment of the present disclosure is not limited thereto.

Optionally, the method 100 further includes the following step.

S150. When the region acquired in S111b or S111c is non-rectangular, determine that the screen capture region is a largest-area or smallest-area rectangle region covered by the region.

When the parallelogram region acquired in S111b is non-rectangular, the parallelogram region may be processed to obtain a rectangular region as the screen capture region. The screen capture apparatus may patch two ends of the parallelogram with two triangular regions and use an acquired rectangular region as the screen capture region, or cut out two internal triangular regions from the parallelogram and use an obtained rectangular region as the screen capture region. This embodiment of the present disclosure is not limited thereto.

When the quadrilateral region acquired in S111c is not a parallelogram, the screen capture apparatus may perform a processing operation on the quadrilateral to obtain a parallelogram, and use the parallelogram region as the screen capture region; or the screen capture apparatus performs further processing on the quadrilateral region to obtain a rectangular region, and uses the rectangular region as the screen capture region. This embodiment of the present disclosure is not limited thereto.

Optionally, in another embodiment, the screen capture apparatus may further notify a user of a result of the screen capture after the screen capture succeeds or fails. Correspondingly, the method 100 further includes the following step.

S160. Notify a user that a screen capture operation is successfully performed.

The screen capture apparatus may notify the user by playing a prompt tone, or may notify the user by displaying an image indicating success or failure on the screen. The success-indicating image may be the captured image. However, this embodiment of the present disclosure is not limited thereto.

Optionally, in another embodiment, the screen capture apparatus may display operation options for the image when displaying the captured image, so that the user can perform further operations and processing on the image. Correspondingly, the method 100 further includes the following step.

S170. Present the image on the screen, and present operation options for the image at the same time.

Figure 4:
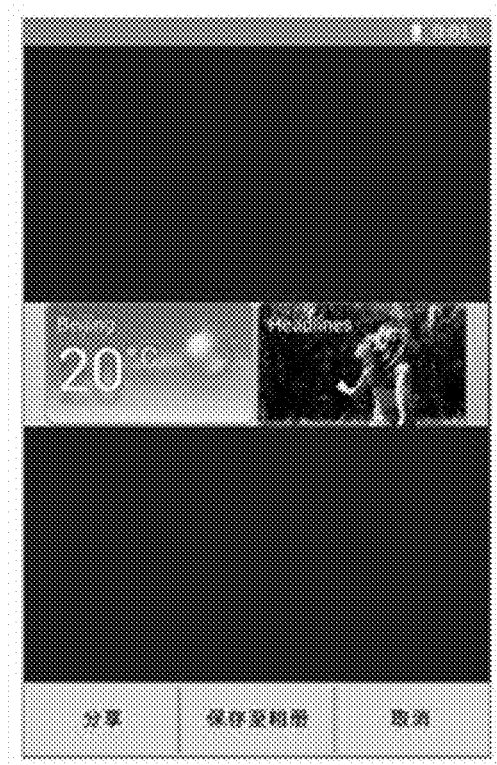
FIG. 4 is a display image when the screen capture operation shown in FIG. 3 is successful.
Figure 6:
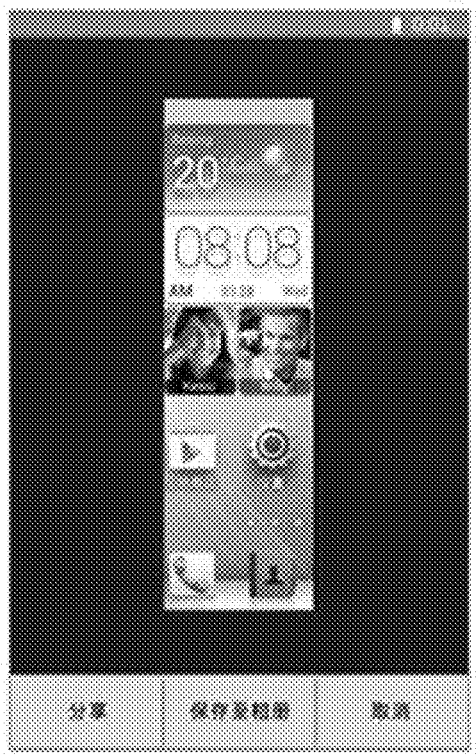
FIG. 6 is a display image when the screen capture operation shown in FIG. 5 is successful.

As shown in FIG. 4 and FIG. 6, the operation options may include a share option, a cancel option, and a save option. Optionally, the operation options may include at least one option of the three options, and the operation options may further include another option. This embodiment of the present disclosure is not limited thereto. The user may tap a corresponding operation option according to a requirement. After receiving an operation instruction of the user, the screen capture apparatus may perform a corresponding operation on the image according to the operation instruction. However, this embodiment of the present disclosure is not limited thereto.

Therefore, according to the screen capture method in this embodiment of the present disclosure, a screen capture operation is performed by recognizing same-direction parallel swiping of two fingers on a screen, so that a user can capture an image displayed in a part of a region of the screen according to an individual requirement, and the method is applicable to various touch-operation terminal devices without the help of an external tool, thereby simplifying the operation and improving user experience.

Figure 7:
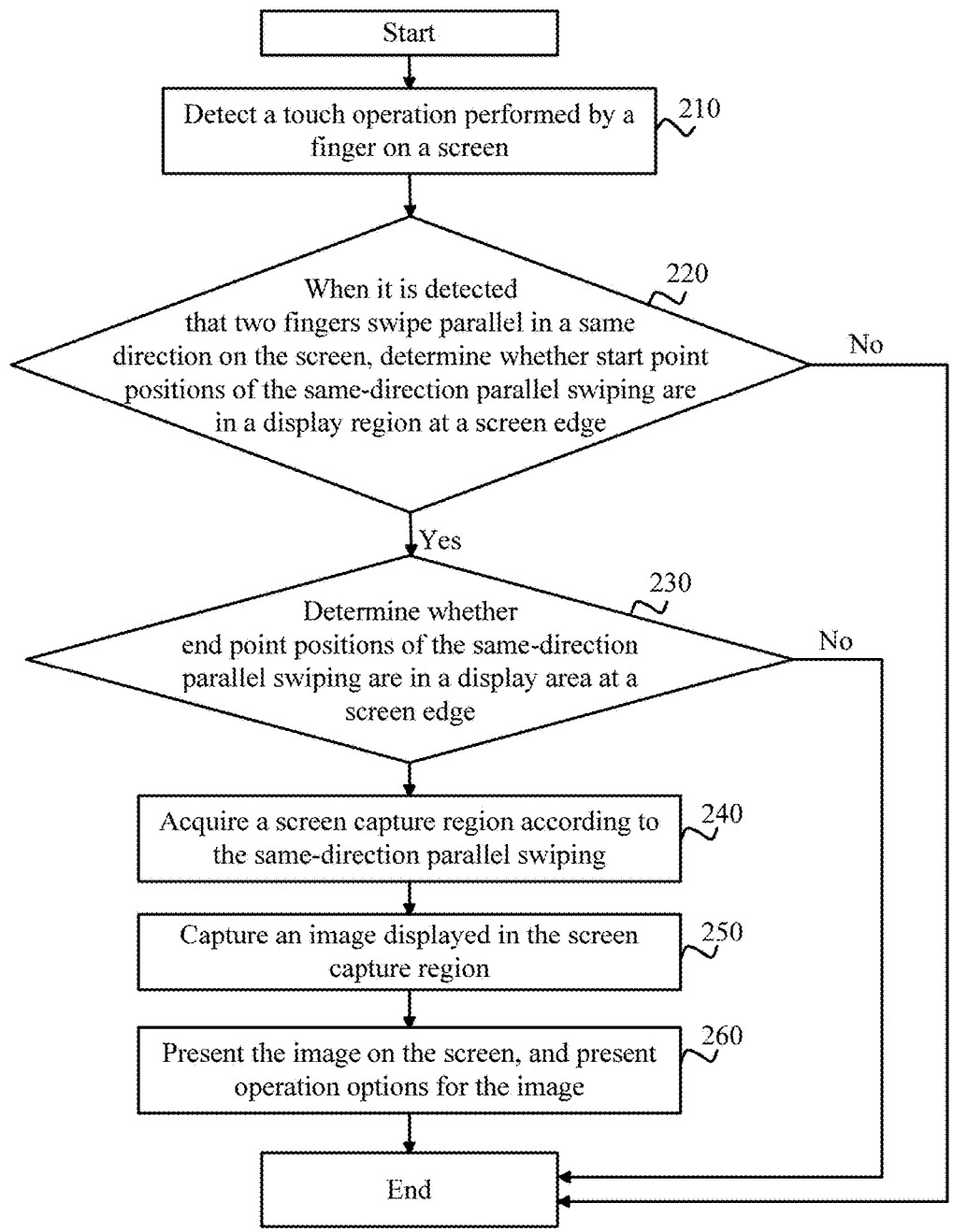
FIG. 7 is a schematic flowchart of a screen capture method according to another embodiment of the present disclosure.

With reference to a specific example, the following describes the screen capture method provided in the embodiments of the present disclosure in more detail. FIG. 7 is a schematic flowchart of a screen capture method 200 according to another embodiment of the present disclosure. The method may be executed by a screen capture apparatus. As shown in FIG. 7, the method 200 includes the following steps.

S210. Detect a touch operation performed by a finger on a screen.

S220. When it is detected that two fingers swipe parallel in a same direction on the screen, determine whether start point positions of the same-direction parallel swiping are in a display region at a screen edge.

The same-direction parallel swiping may be same-direction parallel swiping along a horizontal direction, or may be same-direction parallel swiping along a vertical direction. This embodiment of the present disclosure is not limited thereto. When the screen capture apparatus detects that the two start point positions of the same-direction parallel swiping are both in the edge display region or that at least one start point position of the same-direction parallel swiping is in the edge display region, the screen capture apparatus executes S230; otherwise, the screen capture apparatus determines that the same-direction parallel swiping is an invalid operation, and a procedure of the method 200 ends.

S230. Determine whether end point positions of the same-direction parallel swiping are in a display region at a screen edge.

When the screen capture apparatus detects that the two end point positions of the same-direction parallel swiping are both in the edge display region or that at least one end point position of the same-direction parallel swiping is in the edge display region, the screen capture apparatus executes S240; and otherwise, the screen capture apparatus determines that the same-direction parallel swiping is an invalid operation, and the procedure of the method 200 ends.

S240. Acquire a screen capture region according to the same-direction parallel swiping.

The screen capture apparatus can determine the screen capture region by using multiple manners. For example, the screen capture apparatus acquires the screen capture region according to swipe tracks of the same-direction parallel swiping or according to the start point positions and/or the end point positions of the same-direction parallel swiping. This embodiment of the present disclosure is not limited thereto.

S250. Capture an image displayed in the screen capture region.

S260. Present the image on the screen, and present operation options for the image.

Therefore, according to the screen capture method in this embodiment of the present disclosure, a screen capture operation is performed by recognizing same-direction parallel swiping of two fingers on a screen, so that a user can capture an image displayed in a part of a region of the screen according to an individual requirement, and the method is applicable to various touch-operation terminal devices without the help of an external tool, thereby simplifying the operation and improving user experience.

It should be noted that the example in FIG. 7 is merely intended to help a person skilled in the art better understand the embodiments of the present disclosure, rather than to limit the scope of the embodiments of the present disclosure. A person skilled in the art certainly can make various equivalent modifications or changes according to the example listed in FIG. 7, which also fall within the protection scope of the embodiments of the present disclosure.

It should be understood that sequence numbers of the foregoing processes do not indicate execution order. The execution order of the processes should be determined according to functions and internal logic of the processes, and should not be construed as any limitation on the implementation processes of the embodiments of the present disclosure.

With reference to FIG. 1 to FIG. 7, the foregoing describes the screen capture method according to the embodiments of the present disclosure in detail. The following describes a screen capture apparatus and a terminal device according to the embodiments of the present disclosure in detail with reference to FIG. 8 and FIG. 9.

Figure 8:
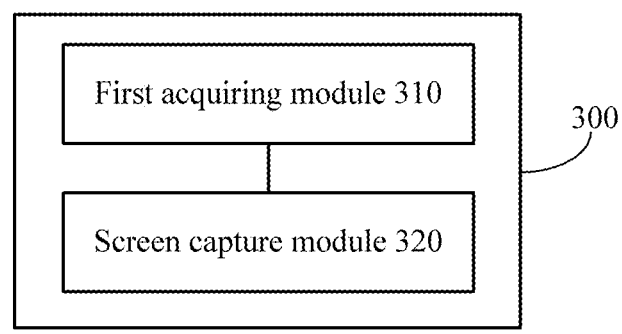
FIG. 8 is a schematic block diagram of a screen capture apparatus according to an embodiment of the present disclosure.

FIG. 8 shows a schematic block diagram of a screen capture apparatus 300 according to an embodiment of the present disclosure. As shown in FIG. 8, the screen capture apparatus 300 includes a first acquiring module 310 configured to, when it is detected that two fingers swipe parallel in a same direction on a screen, acquire a screen capture region according to the same-direction parallel swiping; and a screen capture module 320 configured to acquire, according to the screen capture region acquired by the first acquiring module 310, an image displayed in the screen capture region.

Therefore, according to the screen capture apparatus in this embodiment of the present disclosure, a screen capture operation is performed by recognizing same-direction parallel swiping of two fingers on a screen, so that a user can capture an image displayed in a part of a region of the screen according to an individual requirement, and the screen capture apparatus is applicable to various touch-operation terminal devices without the help of an external tool, thereby simplifying the operation and improving user experience.

Optionally, the screen capture apparatus 300 further includes a second acquiring module 330 configured to, after the first acquiring module 320 detects that the two fingers swipe parallel in a same direction on the screen and before the first acquiring module 320 acquires the screen capture region according to the same-direction parallel swiping, acquire swipe tracks of the same-direction parallel swiping according to the same-direction parallel swiping, and acquire start point positions and/or end point positions of the same-direction parallel swiping according to the same-direction parallel swiping.

Optionally, in another embodiment, the first acquiring module 310 is configured to acquire the screen capture region according to any one or any combination of multiple of the start point positions, the end point positions, and the swipe tracks when the start point positions and/or the end point positions that are acquired by the second acquiring module 330 are in a display region at a screen edge.

Optionally, in another embodiment, the first acquiring module 310 is configured to, when the start point positions and/or the end point positions that are acquired by the second acquiring module 330 are in a display region at a screen edge, acquire the screen capture region according to a region enclosed by the swipe tracks and horizontal lines or by the swipe tracks and vertical lines.

Optionally, in another embodiment, the first acquiring module 310 is configured to, when the start point positions and/or the end point positions that are acquired by the second acquiring module 330 are in a display region at a screen edge, acquire the screen capture region according to a region enclosed by connection lines between the start point positions and the end point positions and horizontal lines or by the connection lines and vertical lines; or when the start point positions and/or the end point positions that are acquired by the second acquiring module 330 are in a display region at a screen edge, acquire the screen capture region according to a region enclosed by successively connecting the start point positions and the end point positions.

Optionally, in another embodiment, the first acquiring module 310 is further configured to, when the region is non-rectangular, determine that the screen capture region is a largest-area or smallest-area rectangle region covered by the region.

Optionally, in another embodiment, the screen capture apparatus 300 further includes a notifying module 340 configured to, when the screen capture module 320 successfully captures the image, notify a user that the screen capture operation is successfully performed.

Optionally, in another embodiment, the screen capture apparatus 300 further includes a display module 350 configured to present the image captured by the screen capture module 320 on the screen, and present operation options for the image at the same time.

The foregoing operations and/or functions and other operations and/or functions of the modules of the screen capture apparatus 300 according to this embodiment of the present disclosure are used for implementing corresponding procedures of the methods in FIG. 1 to FIG. 7 respectively. For brevity, details are not described herein again.

Therefore, according to the screen capture apparatus in this embodiment of the present disclosure, a screen capture operation is performed by recognizing same-direction parallel swiping of two fingers on a screen, so that a user can capture an image displayed in a part of a region of the screen according to an individual requirement, and the screen capture apparatus is applicable to various touch-operation terminal devices without the help of an external tool, thereby simplifying the operation and improving user experience.

Figure 9:
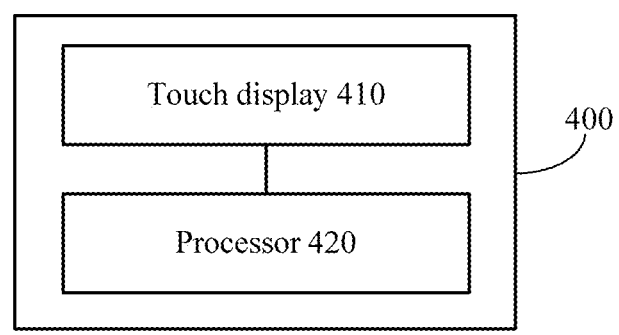
FIG. 9 is a schematic block diagram of a terminal device according to an embodiment of the present disclosure.

FIG. 9 shows a schematic block diagram of a terminal device 400 according to an embodiment of the present disclosure. As shown in FIG. 9, the terminal device 400 includes a touch display 410 configured to present an operation interface corresponding to a function provided by the terminal device, and acquire a touch signal corresponding to a received touch operation; and a processor 420 configured to determine, according to the touch signal acquired by the touch display 410, the touch operation received by the touch display, and when the touch operation is same-direction parallel swiping, acquire a screen capture region according to the same-direction parallel swiping, and capture an image displayed in the screen capture region.

Therefore, according to the terminal device in this embodiment of the present disclosure, a screen capture operation is performed by recognizing same-direction parallel swiping of two fingers on a screen, so that a user can capture an image displayed in a part of a region of the screen according to an individual requirement, and the terminal device is applicable to various touch-operation terminal devices without the help of an external tool, thereby simplifying the operation and improving user experience.

The touch display 410 may acquire the touch operation received by the touch display, and generate the touch signal corresponding to the touch operation. Then, the touch display 410 may transmit the touch signal to the processor 420, and the processor 420 recognizes the touch operation. When the processor 420 recognizes that the touch operation is same-direction parallel swiping of two touch points, the processor 420 can determine that the touch operation is a screen capture operation, and execute a screen capture action according to the screen capture operation. However, this embodiment of the present disclosure is not limited thereto.

It should be understood that, in this embodiment of the present disclosure, the processor 420 may be a central processing unit (CPU), or the processor 420 may be another general purpose processor, a digital signal processor (DSP), an application-specific integrated circuit (ASIC), a field-programmable gate array (FPGA) or other programmable logical device, a discrete gate or transistor logic device, a discrete hardware component, or the like. The general purpose processor may be a microprocessor, or the processor may be any conventional processor, or the like.

In an implementation process, the steps of the foregoing methods may be completed by means of an integrated logic circuit of hardware in the processor 420 or instructions in a form of software. Steps of the methods disclosed with reference to the embodiments of the present disclosure may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory or electrically-erasable programmable memory, or a register. The storage medium is located in the memory. The processor 420 reads information from the memory, and completes the steps of the foregoing methods in combination with the hardware. To avoid repetition, details are not described herein again.

Optionally, the processor 420 is further configured to, before acquiring the screen capture region according to the same-direction parallel swiping, acquire swipe tracks of the same-direction parallel swiping, and acquire start point positions and/or end point positions of the same-direction parallel swiping.

Optionally, in another embodiment, the processor 420 is configured to acquire the screen capture region according to any one or any combination of multiple of the start point positions, the end point positions, and the swipe tracks when the start point positions and/or the end point positions are in a display region at a screen edge.

Optionally, in another embodiment, the processor 420 is configured to, when the start point positions and/or the end point positions are in a display region at a screen edge, acquire the screen capture region according to a region enclosed by the swipe tracks and horizontal lines or by the swipe tracks and vertical lines.

Optionally, in another embodiment, the processor 420 is configured to, when the start point positions and/or the end point positions are in a display region at a screen edge, acquire the screen capture region according to a region enclosed by connection lines between the start point positions and the end point positions and horizontal lines or by the connection lines and vertical lines; or the processor 420 is configured to, when the start point positions and/or the end point positions are in a display region at a screen edge, acquire the screen capture region according to a region enclosed by successively connecting the start point positions and the end point positions.

Optionally, in another embodiment, the processor 420 is further configured to, when the region is non-rectangular, determine that the screen capture region is a largest-area or smallest-area rectangle region covered by the region.

Optionally, in another embodiment, the processor 420 is further configured to, when successfully capturing the image, notify a user that the screen capture operation is successfully performed.

Optionally, in another embodiment, the touch display 410 is further configured to present the image captured by the processor 420 on the screen, and present operation options for the image at the same time.

The foregoing operations and/or functions and other operations and/or functions of the modules of the terminal device 400 according to this embodiment of the present disclosure are used for implementing corresponding procedures of the methods in FIG. 1 to FIG. 7 respectively. For brevity, details are not described herein again.

Therefore, according to the terminal device in this embodiment of the present disclosure, a screen capture operation is performed by recognizing same-direction parallel swiping of two fingers on a screen, so that a user can capture an image displayed in a part of a region of the screen according to an individual requirement, and the terminal device is applicable to various touch-operation terminal devices without the help of an external tool, thereby simplifying the operation and improving user experience.

It should be understood that, in the embodiments of the present disclosure, the term "and/or" describes only association relationships between associated objects, and indicates that three relationships may exist. For example, A and/or B may represent the following three cases: only A exists, both A and B exist, and only B exists. In addition, the character "/" in this specification generally indicates an "or" relationship between the associated objects.

A person of ordinary skill in the art may be aware that the method steps and units described with reference to the embodiments disclosed herein may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any mediums that can store program code, such as a universal serial bus (USB) flash drive, a removable hard disk, a read-only memory (ROM), a random access memory (RAM), a magnetic disc, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A screen capture method, comprising:
    detecting, according to a same-direction parallel swiping operation of two fingers, whether start point positions and end point positions of the same-direction parallel swiping operation are outside a screen edge;
    detecting that the same-direction parallel swiping operation is an invalid screen capture operation when the start point positions and the end point positions of the same-direction parallel swiping operation are outside the screen edge;
    acquiring a screen capture region according to the same-direction parallel swiping operation when detecting that the two fingers swipe parallel in the same direction on a screen and after detecting that the start point positions and the end point positions are within the screen edge, wherein the screen capture region is determined by the start point positions, the end point positions, and swipe tracks of the same-direction parallel swiping operation; and
    acquiring, according to the screen capture region, an image displayed in the screen capture region.

2. The screen capture method according to claim 1, wherein acquiring the screen capture region comprises:
    acquiring the swipe tracks of the same-direction parallel swiping operation according to a same-direction parallel swiping motion of the two fingers; and
    acquiring the start point positions or end point positions of the same-direction parallel swiping operation or acquiring the start point positions and the end point position of the same-direction parallel swiping operation according to the same-direction parallel swiping operation of the two fingers.

3. The screen capture method according to claim 2, wherein acquiring the screen capture region comprises acquiring the screen capture region according to at least one of the start point positions, the end point positions, or the acquired swipe tracks when the start point positions or the end point positions are at the screen edge or when the start point positions and the end point positions are at the screen edge.

4. The screen capture method according to claim 3, wherein acquiring the screen capture region according to at least one of the start point positions, the end point positions, or the acquired swipe tracks comprises acquiring the screen capture region according to a region enclosed by the acquired swipe tracks and one of horizontal lines or vertical lines when the start point positions are at the screen edge.

5. The screen capture method according to claim 3, wherein acquiring the screen capture region according to at least one of the start point positions, the end point positions, or the acquired swipe tracks comprises:
    acquiring the screen capture region according to a region enclosed by connection lines between the start point positions and the end point positions and horizontal lines or by the connection lines and vertical lines when the start point positions or the end point positions are at the screen edge or when the start point positions and the end point positions are at the screen edge; or acquiring the screen capture region according to a region enclosed by successively connecting the start point positions and the end point positions when the start point positions or the end point positions are at the screen edge or when the start point positions and the end point positions are at the screen edge.

6. The screen capture method according to 23, wherein the region enclosed is non-rectangular, and wherein the acquired screen capture region is a largest rectangular area covered by an area of the region enclosed or a smallest rectangular area that covers the area of the region enclosed.

7. A screen capture apparatus, comprising:
a memory comprising instructions; and
a computer processor coupled to the memory, wherein the instructions cause the computer processor to be configured to:
detect, according to a same-direction parallel swiping operation of two fingers, whether start point positions and end point positions of the same-direction parallel swiping operation are outside a screen edge;
detect that the same-direction parallel swiping operation is an invalid screen capture operation when the start point positions and the end point positions of the same-direction parallel swiping operation are outside the screen edge;
acquire a screen capture region according to the same-direction parallel swiping operation when detecting that the two fingers swipe parallel in the same direction on a screen and after detecting that the start point positions and the end point positions are within the screen edge, wherein the screen capture region is determined by the start point positions, the end point positions, and swipe tracks of the same-direction parallel swiping operation; and
acquire, according to the screen capture region, an image displayed in the screen capture region.

8. The screen capture apparatus according to claim 7, wherein after detecting the same direction parallel swiping operation of the two fingers on the screen, the instructions further cause the computer processor to be configured to:
acquire swipe tracks of the same-direction parallel swiping operation according to a same-direction parallel swiping motion of the two fingers; and
acquire the start point positions or the end point positions of the same-direction parallel swiping operation or acquire the start point positions and the end point positions of the parallel swiping operation according to the parallel swiping-motion of the two fingers.

9. The screen capture apparatus according to claim 8, wherein the instructions further cause the computer processor to be configured to acquire the screen capture region according to at least one of the start point positions, the end point positions, or the acquired swipe tracks when the start point positions or the end point positions are in a display region at the screen edge or when the start point positions and the end point positions are in a display region at the screen edge.

10. The screen capture apparatus according to claim 9, wherein the instructions further cause the computer processor to be configured to acquire the screen capture region according to a region enclosed by the acquired swipe tracks and horizontal lines or by the acquired swipe tracks and vertical lines when the start point positions or the end point positions are in the display region at the screen edge or when the start point positions and the end point positions are in the display region at the screen edge.

11. The screen capture apparatus according to claim 9, wherein the instructions further cause the computer processor to be configured to:
acquire the screen capture region according to a region enclosed by connection lines between the start point positions and the end point positions and horizontal lines or by the connection lines and vertical lines when at least one of the start point positions or the end point positions are in the display region at the screen edge; and
acquire the screen capture region according to a region enclosed by successively connecting the start point positions and the end point positions when the start point positions or the end point positions are in the display region at the screen edge or when the start point position and the end point positions are in the display region at the screen edge.

12. The screen capture apparatus according to claim 11, wherein the screen capture region is a largest rectangular area covered by an area of the enclosed region or a smallest rectangular area that covers the area of the enclosed region when the region is non-rectangular.

13. A terminal device, comprising:
a memory comprising instructions; and
a processor coupled to the memory, wherein the instructions cause the processor to be configured to:
present an operation interface corresponding to a function provided by the terminal device;
acquire a touch signal corresponding to a received touch operation by a touch display;
determine, according to the acquired touch signal, the touch operation received by the touch display;
detect, according to a same-direction parallel swiping operation of two fingers, whether start point positions and end point positions of the same-direction parallel swiping operation are outside a screen edge;
detect that the same-direction parallel swiping operation is an invalid screen capture operation when the start point positions and the end point positions of the same-direction parallel swiping operation are outside the screen edge;
acquire a screen capture region according to the same-direction parallel swiping operation when detecting that the two fingers swipe parallel in the same direction on a screen and after detecting that the start point positions and the end point positions are within the screen edge, wherein the screen capture region is determined by the start point positions, the end point positions, and swipe tracks of the same-direction parallel swiping operation; and
acquire an image displayed in the screen capture region according to the screen capture region.

14. The terminal device according to claim 13, wherein the instructions further cause the processor to be configured to:
acquire swipe tracks of the same-direction parallel swiping operation according to a same-direction parallel swiping motion of the two fingers; and
acquire at least one of the start point positions or the end point positions of the same-direction parallel swiping motion of the two fingers.

15. The terminal device according to claim 14, wherein the instructions further cause the processor to be configured to acquire the screen capture region according to the start point positions, the end point positions, and the acquired swipe tracks when the start point positions or the end point positions are at the screen edge on the touch display.

16. The terminal device according to claim 15, wherein the instructions further cause the processor to be configured to acquire the screen capture region according to a region enclosed by the acquired swipe tracks and horizontal lines or by the acquired swipe tracks and vertical lines when at least one of the start point positions and the end point positions are at the screen edge.

17. The terminal device according to claim 15, wherein the instructions further cause the processor to be configured to:
  acquire the screen capture region according to a region enclosed by connection lines between the start point positions and the end point positions and horizontal lines or by the connection lines and vertical lines when at least one of the start point positions or the end point positions are at the screen edge; and
  acquire the screen capture region according to a region enclosed by successively connecting the start point positions and the end point positions when at least one of the start point positions or the end point positions are at the screen edge.

18. The terminal device according to claim 17, wherein the instructions further cause the processor to be configured to determine that the screen capture region is a largest rectangular area covered by an area of the region or a smallest rectangular area that covers the area of the region when the region is non-rectangular.

19. The terminal device according to claim 14, wherein the instructions further cause the processor to be configured to acquire the screen capture region according to the end point positions when the end point positions are at a screen edge on the touch display.

20. The terminal device according to claim 14, wherein the instructions further cause the processor to be configured to acquire the screen capture region according to the start point positions when the start point positions are at a screen edge on the touch display.

* * * * *

UNITED STATES PATENT AND TRADEMARK OFFICE
CERTIFICATE OF CORRECTION

PATENT NO. : 9,983,770 B2
APPLICATION NO. : 14/901866
DATED : May 29, 2018
INVENTOR(S) : Kaifang Zheng It is certified that error appears in the above-identified patent and that said Letters Patent is hereby corrected as shown below:

On the Title Page

Under Notice should read:
Subject to any disclaimer, the term of this patent is extended or adjusted under 35 U.S.C. 154(b) by 0 days.

In the Claims

Column 17; Line 10; Claim 6 should read:
The screen capture method according to claim 5, wherein the Signed and Sealed this
Tenth Day of July, 2018

Andrei Iancu
*Director of the United States Patent and Trademark Office*